United States Patent [19]
Koslow

[11] Patent Number: 5,685,981
[45] Date of Patent: Nov. 11, 1997

[54] WATER FILTER

[75] Inventor: Evan E. Koslow, Weston, Conn.

[73] Assignee: KX Industries, L.P., Orange, Conn.

[21] Appl. No.: 607,088

[22] Filed: Feb. 28, 1996

[51] Int. Cl.⁶ .................................................. B01D 27/08
[52] U.S. Cl. .................. 210/282; 210/423; 210/424; 210/429; 210/451; 210/456; 210/459
[58] Field of Search ..................... 210/232, 282, 210/429, 451, 455, 456, 459, 497.01, 117, 136, 422, 423, 424

[56] References Cited

U.S. PATENT DOCUMENTS

| | | | |
|---|---|---|---|
| 4,325,732 | 4/1982 | Woog | 210/497.01 |
| 4,735,716 | 4/1988 | Petrucci | 210/232 |
| 4,806,240 | 2/1989 | Giordano | 210/232 |
| 4,915,831 | 4/1990 | Taylor | 210/497.01 |
| 5,017,286 | 5/1991 | Heiligman | 210/282 |
| 5,151,179 | 9/1992 | Bach et al. | 210/282 |
| 5,194,149 | 3/1993 | Selbie et al. | 210/497.01 |
| 5,443,721 | 8/1995 | Kelada et al. | 210/455 |
| 5,510,031 | 4/1996 | Knauf et al. | 210/460 |

*Primary Examiner*—W. L. Walker
*Attorney, Agent, or Firm*—Ware, Fressola, Van der Sluys & Adolphson, LLP

[57] ABSTRACT

A water treatment or filtration unit is in two parts, a base and a cartridge. The base includes three ports, one of which may be selectively plugged or otherwise disabled. The cartridge contains the water treating material and is screwed into a socket in the base. Openings in the cartridge are then aligned with openings in the base to allow water to pass therethrough. Cartridges may be readily exchanged by simply unscrewing from, and screwing into, the base.

13 Claims, 3 Drawing Sheets

WATER FILTER

TECHNICAL FIELD

This invention relates to water treating apparatus. More particularly, it relates to a water treating cartridge which is easily replaced and discarded at the end of its useful life and which is adapted for use in several configurations.

BACKGROUND ART

Conventional water filters of the type employed domestically have filtration units that are difficult and messy to replace. They often require the removal of hoses and water is readily spilled. Accordingly, it is a primary object of the present invention to provide a unit which has a filter which is readily changeable without spillage. Other objects, features and advantages will become apparent from the following description and appended claims.

DISCLOSURE OF INVENTION

The invention comprises a cartridge which encloses a water treating material such as a filter and a base which receives the cartridge. The base includes three water passages which are connectable to water supplying and water dispensing devices. The base is designed in such a manner that one of the three passages may be plugged. The cartridge is designed to receive water from one of the unplugged passages and supply it after treatment to the other unplugged passage. The cartridge is easily inserted and retained in the base and is also readily removable for disposal.

BEST MODE FOR CARRYING OUT THE INVENTION

With particular reference to FIGS. 1–7 there is illustrated a water treatment unit comprising a base 10 and a cartridge 12.

Base

Figure 3:
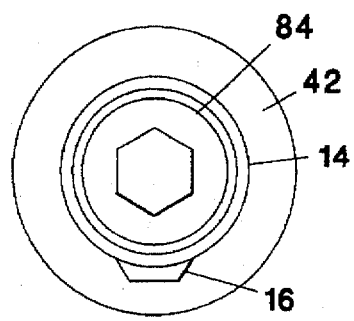
FIG. 3 is a top view of the unit of FIG. 1.
Figure 4:
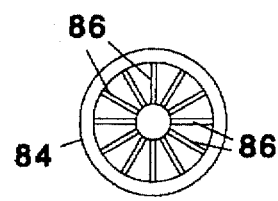
FIG. 4 is a cross-section taken substantially along the line 4—4 of FIG. 1.
Figure 1:
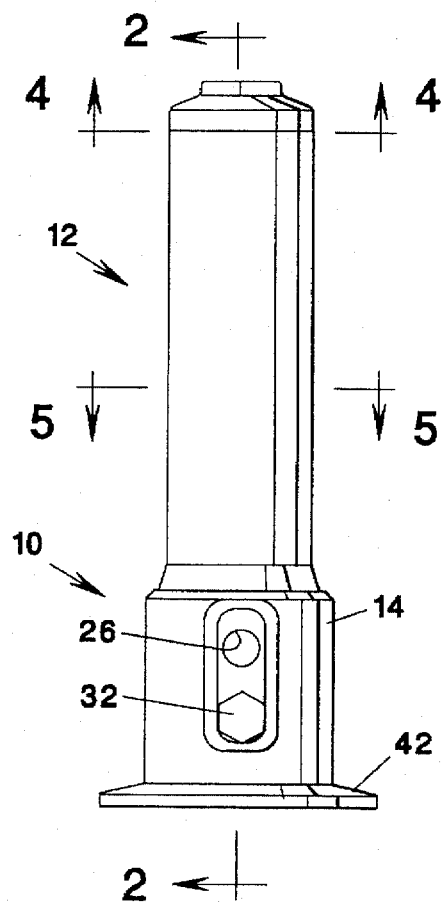
FIG. 1 is an elevational view of a water treatment unit in accordance with the present invention.
Figure 2:
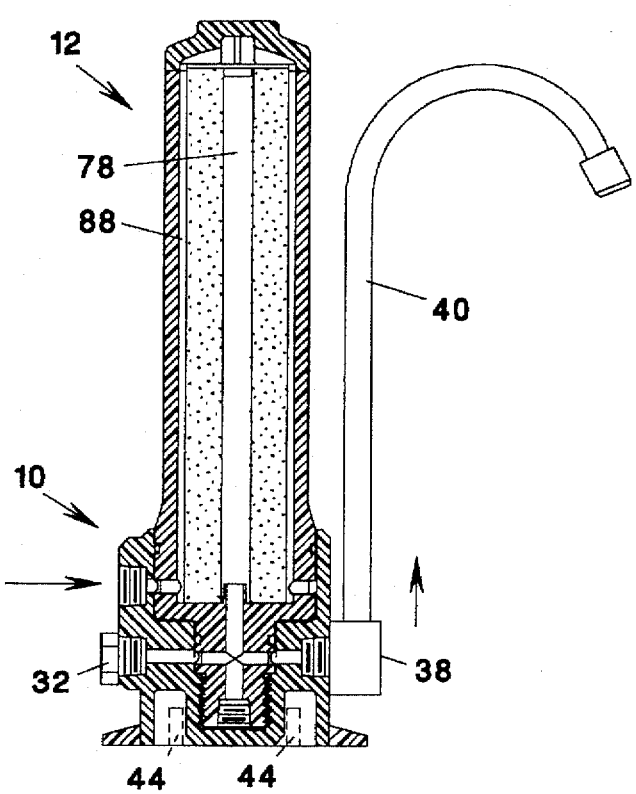
FIG. 2 is a cross-section taken substantially along the line 2—2 of FIG. 1.
Figure 6:
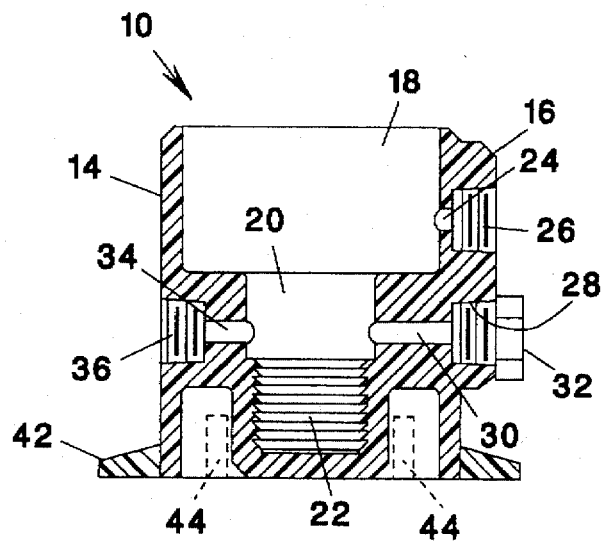
FIG. 6 is an enlarged cross-section of the base portion of the unit.

Base 10 may be of a plastic material such as polypropylene and may best be seen in FIG. 6. It includes a generally cylindrical housing 14 having a raised boss 16 along one side. The housing 14 includes a vertical socket 18 extending partially into the housing and then continuing further as a smaller diameter receptacle 20 terminating in a threaded portion 22. A radial first passage 24 extends from the boss 16 and through the wall of the housing 14. It connects to a threaded port 26 at the surface of the boss. Directly below the port 26 is a second port 28 which connects to a second radial passage 30 which extends into the receptacle 20 portion of the socket 18. As illustrated in FIGS. 1, 2 and 6, the second passage 30 is blocked by a threaded plug 32. On the opposite side of the housing 14, and diametrically aligned with the second passage 30, is a third passage 34. The third passage 34 terminates in a similar third port 36 into which may be screwed a standard fitting 38 having a spout 40 (FIG. 2).

In order to enable the base 10 to sit upon a countertop or sink surface, a plastic base ring 42 is provided. The base ring 42 is connected to the base 10 by a friction fit so that it may be readily removed. Also provided in the lower surface of base 10, as viewed in FIGS. 1, 2 and 6 are four threaded mounting holes 44, two of which are illustrated in FIGS. 2 and 6. Their purpose will be described infra.

Cartridge

Figure 7:
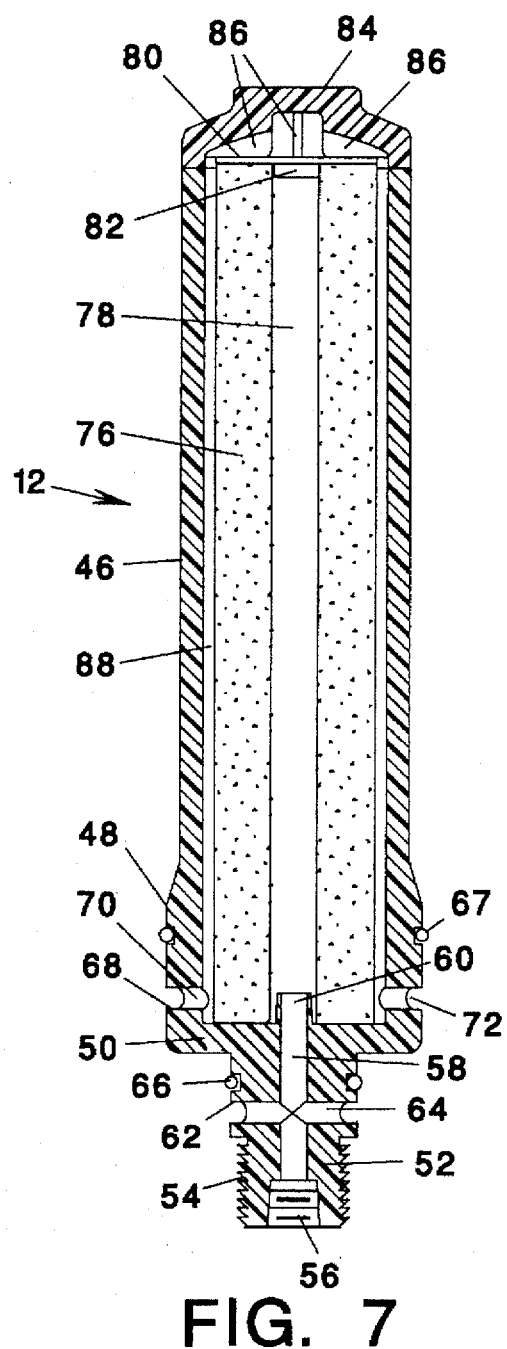
FIG. 7 is an enlarged cross-section of the cartridge portion of the unit.

The cartridge is best described by reference to FIG. 7. It too may be made of a plastic such as polypropylene. It comprises a substantially cylindrical housing having a sidewall 46, the lower portion 48 being slightly flared to fit the socket 18 of the base 10. The lower end is closed by a base wall 50 from which extends a stud 52 having a thread 54 on its lower end. The lower end also includes an internally threaded port 56 leading to an axial passageway 58 which exits into the interior of the hollow cartridge through a short tube 60. A circumferential groove 62 encircles the stud 52 and a diametrical channel 64 extends between opposite sides of the groove 62 and across the passageway 58. Just above the groove 62 another circumferential groove retains an O-ring 66. The lower portion 48 of the cartridge 12 also carries a circumferential groove 68. A pair of aligned radial passages 70, 72 extend from opposite sides of the groove 68 and through the wall 46.

Figure 5:
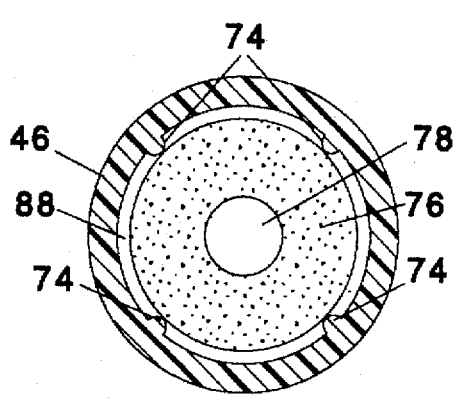
FIG. 5 is an enlarged cross-section taken substantially along the line 5—5 of FIG. 1.

The interior surface of the wall 46 carries a plurality of vertical fibs 74 (FIG. 5). These need not be continuous ribs as their function is to space the exterior surface of a hollow cylindrical filter 76 from the interior surface of the wall 46. The filter 76 my be a porous solid activated carbon filter of the type described in Koslow U.S. Pat. Nos. 5,331,037; 5,189,092; and 5,249,948. The present invention, however, is not limited to the use of any particular type of filter, or even to a filter, as the cartridge 12 may contain any type of water treating material. As will be clear from FIG. 7, the filter 76 which is illustrated a central longitudinal passage 78 which, at its lower end, receives the robe 60. The tube 60 together with the ribs 74 serve to maintain the filter 76 in its correct position within the cartridge 12. The top end of the filter 76 is closed by a disk 80 which, in the illustrated embodiment, has a central protrusion 82 which extends into the passage 78 for purposes of alignment. However, as the function of the disk 80 is merely to prevent water from passing axially into the end of the filter 76, any means may be used which will perform this function.

In addition to the O-ring 66 on the stud 52, a second O-ring 67 is mounted on a groove above the passages 70, 72. The top end of the cartridge 12 is closed by a cap 84. The cap 84 is welded to the top of the sidewall 46 and includes a plurality of radial ribs 86 (FIG. 4) which bear downwardly against the top of the disk 80 and filter 76.

Operation

The cartridge 12 is inserted into the base 10 and the threads 54 on the cartridge are threaded into the threads 22 of the base. The O-rings 66, 84 seal against the inner surfaces of the base 10 thereby preventing leakage. FIGS. 1 and 2 represent one mode of operation wherein the plug 32 is in the lowermost opening in boss 16 and the fitting 38 of spout 40 (both conventional) is connected into the third port 36 of the base 10. In this configuration water, as from a sink faucet, enters the unit through the first passage 24. Because the cartridge 12 has a circumferential groove 68 to receive the water from the first passage 24, the location of its radial passages 70, 72 relative to the first passage 24 in the base is irrelevant.

Water enters the cartridge 12 in the space 88 between the sidewall 46 and the filter 76. Because the upper end of the passage 78 through the filter is blocked, water is forced to flow radially through the porous filter and down its central passage 78 where it enters the passageway 58 at the bottom of the filter cartridge. It there flows radially outwardly through the channel 64 and the groove 62 to enter the third passage 34 in the base 10. It is prevented from passing through the second passage 30 by virtue of the plug 32. The filtered, or otherwise treated, water then passes through the fitting 38 and out the spout 40.

Figure 8:
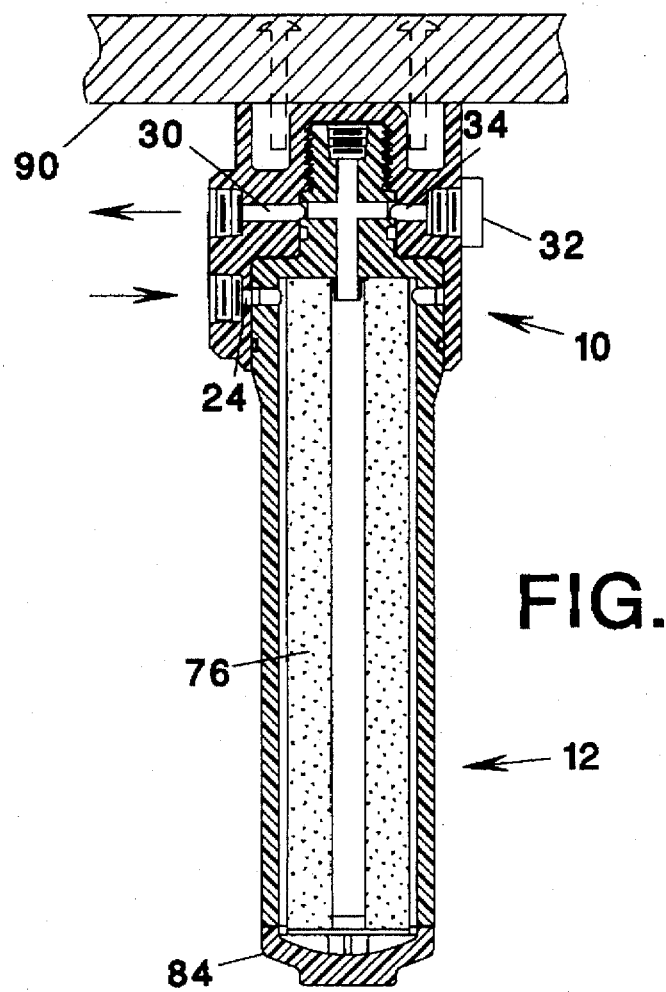
FIG. 8 is a view similar to FIG. 2 illustrating the unit in a different operating mode.

As previously explained, the water treatment unit of this invention is extremely versatile. This is illustrated by the versions illustrated in FIGS. 8 and 9. FIG. 8 illustrates a version wherein the base ring 42 has been removed from the base and the latter is mounted inverted to a mounting surface 90 which might be, for example, the undersurface of a counter. In this modification, plug 32 has been moved from the inlet to second passage 30 to the inlet to third passage 34. In other respects, the arrangement of parts is the same. Water now flows into the unit as previously through the first passage 24 and exits from the second passage 30.

Figure 9:
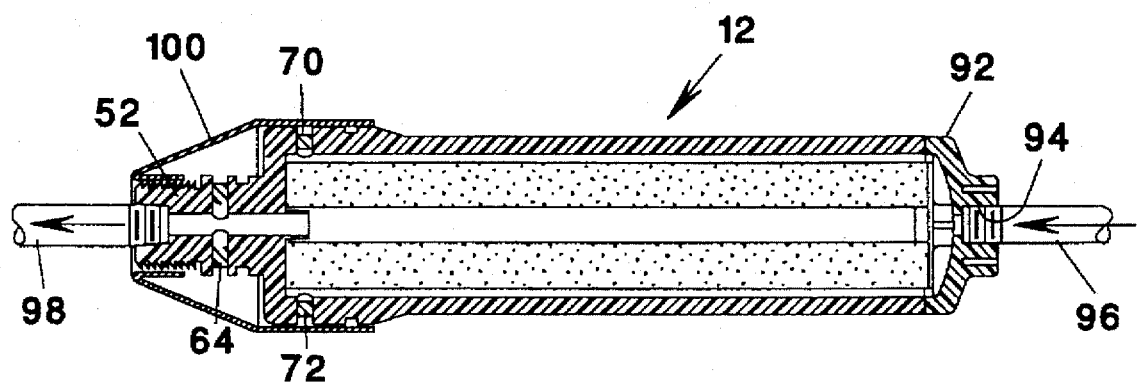
FIG. 9 is a cross-section illustrating the cartridge portion of the unit in still another configuration.

Finally, as illustrated in FIG. 9 the cartridge 12 may be employed as a conventional in-line filter. In this arrangement, the radial ports 70, 72 and 64 are plugged or otherwise eliminated. The end cap 84 is replaced by an end cap 92 which has a threaded female opening 94 to which a water line 96 is engaged. At the opposite end, a water line 98 connects to the threads 56 in the end of the stud 52. A frusto-conical housing 100 may be employed for cosmetic purposes.

It is believed that the many advantages of this invention will now be apparent to those skilled in the art. It will also be apparent that a number of variations and modifications may be made therein without departing from its spirit and scope. Accordingly, the foregoing description is to be construed as illustrative only, rather than limiting. This invention is limited only by the scope of the following claims.

I claim:

1. A water treatment unit which comprises:

a base member m the form of a housing having an exterior and defining an interior socket for receiving the end of a water treating cartridge, and first, second, and third water passages extending between said exterior and said socket;

an elongated water treating cartridge enclosing a water treating material and having a closed first end and a second end insertable into said socket, said second end further defining a water inlet opening and a water outlet opening, one of said openings being alignable with said first water passage and the other of said openings being alignable with said second and third passages when so inserted;

means for retaining said second end in said socket; and means for selectively closing one of said second and third passages to water flow.

2. The unit of claim 1 wherein said water treating material is in the form of a porous cylinder having a longitudinal passage therethrough.

3. The unit of claim 2 wherein said water treating material is activated carbon.

4. The unit of claim 2 wherein said cartridge has a cylindrical wall spaced from said cylinder to form a hollow cylindrical water passage therewith.

5. The unit of claim 4 wherein said material is a right circular cylinder and said longitudinal passage extends along its longitudinal axis.

6. The unit of claim 5 wherein water flows radially through said cylinder between said longitudinal passage and said hollow cylindrical passage.

7. The unit of claim 1 wherein said retaining means comprises a threaded female receptacle in said socket and a threaded male stud on the second end of said cartridge.

8. The unit of claim 6 wherein said retaining means comprises a threaded female receptacle in said socket and a threaded male stud on the second end of said cartridge.

9. A water treating cartridge comprising:

a housing including a side wall and first and second ends;

a water treating material contained within said housing, said material having an outer surface spaced from said side wall to form an exterior passage therewith, and an interior passage through said material;

a substantially cylindrical stud extending from said housing along its longitudinal axis and carrying means for engaging an external base member;

a first water passage extending longitudinally through said stud in fluid flow communication with the interior passage through said material;

a radial second water passage extending into said stud in fluid flow communication with said first water passage; and a third water passage extending through said side wall in fluid flow communication with said exterior passage.

10. The cartridge of claim 9 wherein a circumferential groove encircles said stud and includes the end of said second water passage.

11. The cartridge of claim 9 wherein a circumferential groove encircles said side wall and includes the end of said third water passage.

12. The cartridge of claim 10 wherein said water treating material is a porous solid hollow cylinder comprising activated carbon.

13. The cartridge of claim 12 wherein said a circumferential groove encircles said side wall and includes the end of said third water passage.

\* \* \* \* \*